United States Patent
Reed

(10) Patent No.: US 8,949,487 B1
(45) Date of Patent: Feb. 3, 2015

(54) DATA TRANSMISSION FROM DATA STORAGE DEVICE

(71) Applicant: Western Digital Technologies, Inc., Irvine, CA (US)

(72) Inventor: Christopher J. Reed, Boulder, CO (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/030,991

(22) Filed: Sep. 18, 2013

Related U.S. Application Data

(60) Provisional application No. 61/859,463, filed on Jul. 29, 2013.

(51) Int. Cl.
| G06F 3/00 | (2006.01) |
| G06F 5/00 | (2006.01) |
| G06F 5/10 | (2006.01) |
| G06F 13/12 | (2006.01) |

(52) U.S. Cl.
CPC ................ G06F 5/10 (2013.01); G06F 13/122 (2013.01)

USPC .................................. 710/29; 710/30; 710/52

(58) Field of Classification Search
None
See application file for complete search history.

(56) References Cited

U.S. PATENT DOCUMENTS

| 2006/0050738 | A1* | 3/2006 | Carr et al. ..................... 370/474 |
| 2007/0005903 | A1 | 1/2007 | Lau et al. |
| 2008/0104313 | A1* | 5/2008 | Chu ............................. 711/104 |
| 2012/0233363 | A1 | 9/2012 | Gulati et al. |

* cited by examiner

*Primary Examiner* — Kris Rhu

(57) ABSTRACT

Data transmission from a data storage device (DSD) to a host. Data is received from a volatile memory of the DSD in an ingress buffer of the DSD and the data from the ingress buffer is formatted into formatted data. A size of data buffered in the ingress buffer is compared to a frame ingress size for data to be buffered in the ingress buffer for a frame to be transmitted to the host. It is determined based on the comparison whether to buffer all of the formatted data for the frame in an egress buffer of the DSD before transmission to the host, or to transmit at least a portion of the formatted data for the frame to the host before all of the formatted data for the frame is received in the egress buffer.

20 Claims, 3 Drawing Sheets

DATA TRANSMISSION FROM DATA STORAGE DEVICE

CROSS-REFERENCE TO RELATED APPLICATION

This application claims the benefit of U.S. Provisional Application No. 61/859,463, filed on Jul. 29, 2013, which is hereby incorporated by reference in its entirety.

BACKGROUND

Data storage devices (DSDs) are often used in a computer system or other type of electronic device to record data onto or to reproduce data from a recording media. One measure of performance of a DSD is the rate at which it can transmit data requested by the host back to the host. Although the transmission rate for a DSD may depend upon the particular bus standard used between the DSD and the host, increasing the rate at which data is transmitted to a host can improve overall system performance. In addition, some systems such as a redundant array of independent disks (RAID) may include multiple DSDs sharing a common bus to a host. In such systems, increasing the transmission rate can improve resource sharing efficiency among the DSDs sharing the common pathway to the host.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed. Reference numbers are reused throughout the drawings to indicate correspondence between referenced elements.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Figure 1:
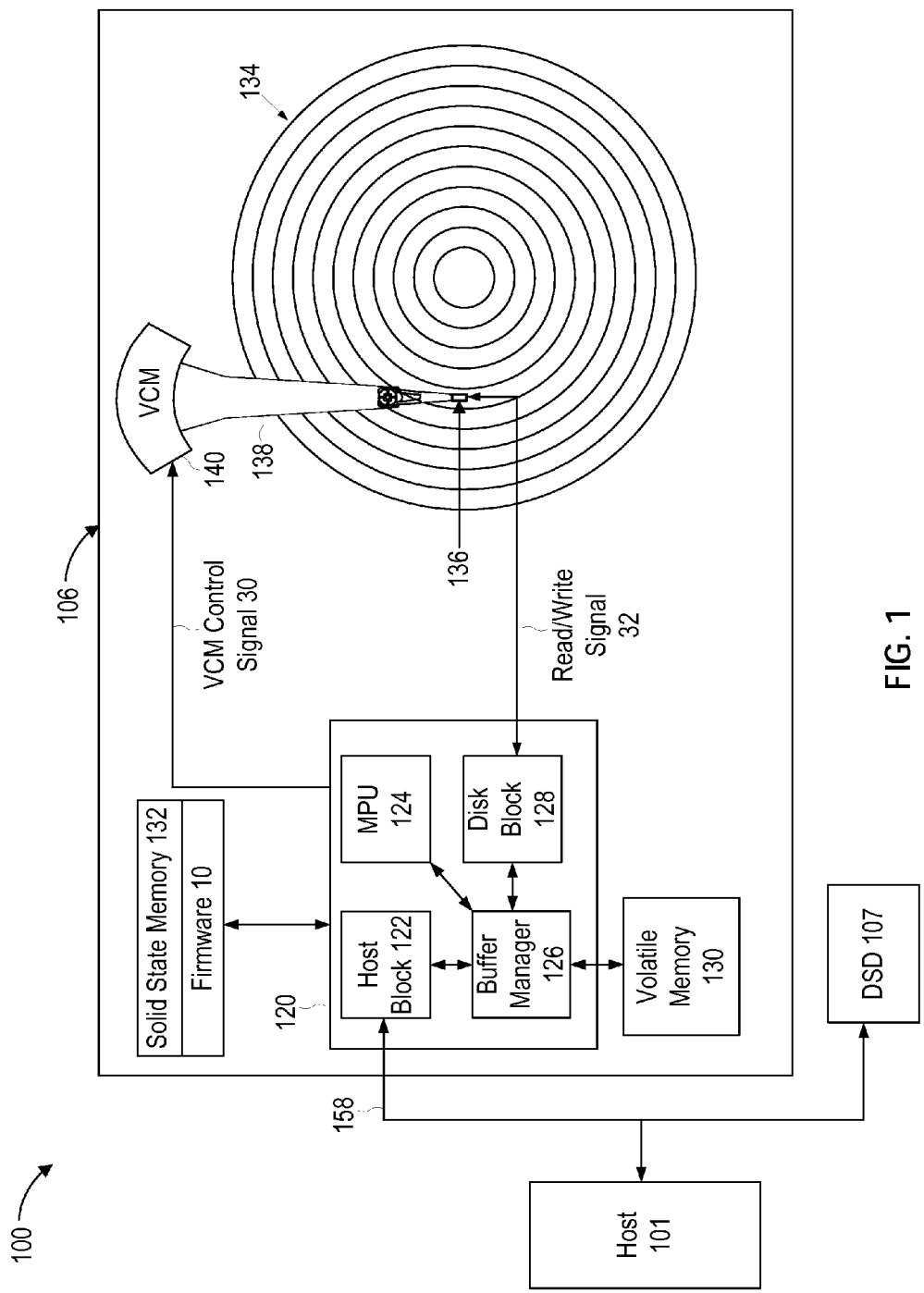
FIG. 1 is a block diagram depicting a data storage device (DSD) in a computer system according to an embodiment.

FIG. 1 shows computer system 100 which includes host 101 and data storage devices (DSDs) 106 and 107 according to one embodiment. Computer system 100 can be, for example, a computer system (e.g., desktop, mobile/laptop, tablet, smartphone, etc.) or other electronic device such as a digital video recorder (DVR). In this regard, computer system 100 may be a stand-alone system or part of a network. Those of ordinary skill in the art will appreciate that computer system 100 and/or DSD 106 can include more or less than those elements shown in FIG. 1 and that the disclosed processes may be implemented in other environments.

DSDs 106 and 107 include non-volatile memory (NVM) for storing data. Such NVM can include a rotating magnetic disk such as disk 134 of DSD 106 and/or solid state memory such as solid state memory 132 of DSD 106. While the description herein refers to solid-state NVM generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

As shown in FIG. 1, DSDs 106 and 107 interface with host 101 via bus 158 which is shared between DSDs 106 and 107. Bus 158 allows host 101 to interface with DSDs 106 and 107 according to a bus standard such as, for example, peripheral component interconnect express (PCIe), serial advanced technology attachment (SATA), or serial attached SCSI (SAS).

DSD 106 includes controller 120 which includes circuitry such as host block 122, microprocessor unit (MPU) 124, buffer manager 126 and disk block 128. Controller 120 can be implemented as a system on a chip (SoC) using one or more processors for executing instructions and can include a microcontroller, a Digital Signal Processor (DSP), an Application Specific Integrated Circuit (ASIC), a Field Programmable Gate Array (FPGA), hard-wired logic, analog circuitry and/or a combination thereof.

In the example of FIG. 1, DSD 106 includes rotating magnetic disk 134 and head 136 connected to the distal end of actuator 138 which is rotated by voice coil motor (VCM) 140 to position head 136 over disk 134. Controller 120 can include servo control circuitry (not shown) to control the position of head 136 using VCM control signal 30 (e.g., control current). Disk 134 comprises a number of radial spaced, concentric tracks for storing data and can form part of a disk pack (not shown) which can include additional disks below disk 134. Head 136 includes at least a read element (not shown) for reading data from disk 134, and a write element (not shown) for writing data on disk 134.

With reference to FIG. 1, DSD 106 also includes solid state memory 132 for storing data, for example, for use as a cache or as part of a solid state hybrid drive (SSHD) implementation of DSD 106. Solid state memory 132 stores firmware 10 which can include computer-readable instructions used by DSD 106 to implement the data transmission and frame build processes described below.

Volatile memory 130 can include, for example, a dynamic random access memory (DRAM) which can be used by DSD 106 as a buffer. Data stored in volatile memory 130 can include data read from NVM (e.g., disk 134 and solid state memory 132), data to be written to NVM, instructions loaded from firmware 10 for execution by controller 120, and/or data for executing firmware 10.

Buffer manager 126 provides access to volatile memory 130 and arbitrates between multiple components requesting access to volatile memory 130 such as host block 122, MPU 124, and disk block 128. In this regard, disk block 128 can include a read/write channel (not shown) for encoding data stored in volatile memory 130 for write signal 32 and decoding read signal 32 into data that is stored in volatile memory 130. MPU 124 can store instructions in volatile memory 130 such as portions of firmware 10 along with data used for the execution of firmware 10.

Host block 122 can store data in volatile memory 130 that is received in host write commands for writing to NVM such as disk 134 or solid state memory 132. In response to host read commands, host block 122 requests data from volatile memory 130 via buffer manager 126.

Figure 2:
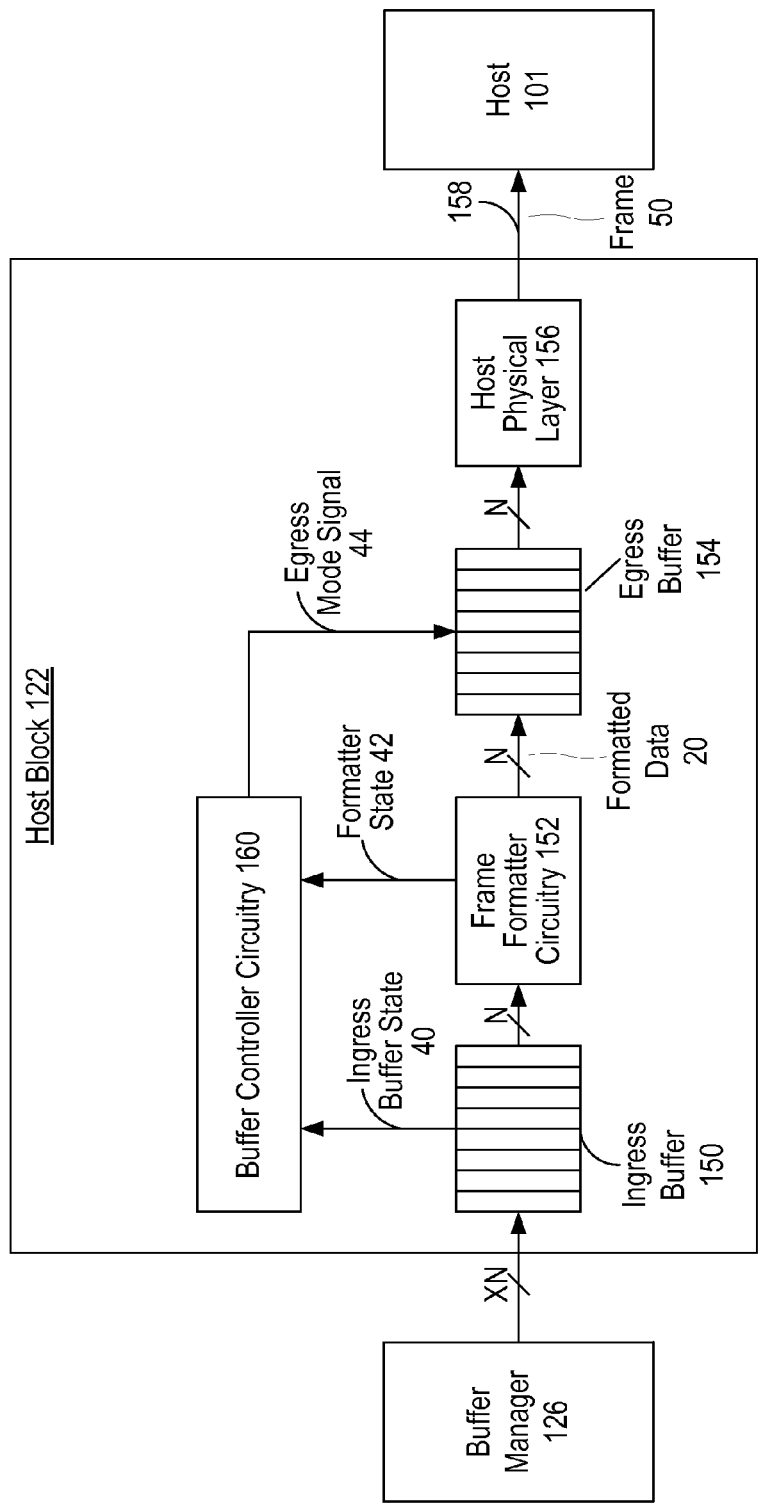
FIG. 2 is a block diagram depicting a host block of the DSD of FIG. 1 according to an embodiment.

FIG. 2 is a block diagram depicting host block 122 according to an embodiment. As shown in FIG. 2, host block 122 includes ingress buffer 150, frame formatter circuitry 152, egress buffer 154, buffer controller circuitry 160 and host physical layer 156. In operation, ingress buffer 150 receives data from buffer manager 126 which has been retrieved from volatile memory 130 in accordance with a host read command received by host block 122. The data read into ingress buffer 150 can be read at a data rate of XN which is a multiple of a data rate of N for the outbound data side of ingress buffer 150. In one implementation, the data rate into ingress buffer 150 is 2N or twice the outbound data rate.

Frame formatter circuitry 152 assembles and formats the data read out of ingress buffer 150 into a protocol-specific format. The formatted data can include, for example, delimiters and a frame header for use in frame 50 which is transmitted to host 101 in accordance with a bus standard such as PCIe, SAS or SATA.

Formatted data 20 from frame formatter circuitry 152 is sent to egress buffer 154 for transmission in frame 50 via host physical layer 156 to host 101. Host physical layer 156 encodes the formatted data and provides electrical signaling on bus 158 to transmit frame 50 to host 101.

In conventional host blocks, formatted data is held in an egress buffer until an entire frame is built before beginning transmission of the frame to the host. Such egress buffers are used in host blocks to avoid gaps in a frame being transmitted to the host. Since the buffer manager arbitrates among different requests for access to volatile memory 130, other blocks such as disk block 128 may have a higher priority than host block 122 when requesting access to volatile memory 130. Host block 122 is therefore not guaranteed a sustained bandwidth from volatile memory 130 and therefore can use egress buffer 154 to reduce any data starvation or gaps in data for frames sent on bus 158 to host 101.

However, buffering all the data for an entire frame in egress buffer 154 before beginning transmission to host 101 can add latency to the transmission process. Such latency can adversely affect the performance of computer system 100 in accessing data stored in DSD 106. Furthermore, additional DSDs sharing bus 158 such as DSD 107 may have to wait before using bus 158 due to this transmission latency of DSD 106.

For more efficient use of bus 158, DSD 106 can use buffer controller circuitry 160 to begin transmission of frame 50 before all of the formatted data for frame 50 has been stored in egress buffer 154 while still maintaining an interface protocol by not allowing gaps in the transmission of frame 50.

In more detail, egress buffer 154 can selectively operate in a "cut through" egress mode or in a "store and forward" egress mode. The cut through mode allows for egress buffer 154 to begin transmitting formatted data 20 for frame 50 before all of formatted data 20 for frame 50 has been stored in egress buffer 154. On the other hand, the store and forward mode can operate as a default egress mode for egress buffer 154 where all of formatted data 20 for frame 50 is stored in egress buffer 154 before beginning transmission of frame 50 to host 101.

Buffer controller circuitry 160 sets the egress mode for egress buffer 154 by considering the amount of data buffered in ingress buffer 150 and whether a state of frame formatter circuitry 152 will allow for beginning transmission of frame 50 before all of formatted data 20 for frame 50 has been buffered in egress buffer 154. In considering the amount of data buffered in ingress buffer 150, buffer controller circuitry 160 can subtract out data path protection symbols such as error detection and correction (EDC) symbols, error correcting code (ECC) symbols, and/or T10 data integrity feature (T10 DIF) symbols which are not transmitted as a part of frame 50.

The state of frame formatter circuitry 152 may include considerations of whether frame formatter circuitry can currently allow egress buffer 154 to operate in a cut through mode. Such considerations may include, for example, whether frame formatter circuitry 152 is using a "skip mask" to control the rate at which data is transferred to host 101 or whether frame formatter circuitry 152 is using a resource de-allocation process to indicate when volatile memory 130 is no longer in use by host block 122.

As shown in FIG. 2, buffer controller circuitry 160 determines a size of the data buffered in ingress buffer 150 using ingress buffer state 40 and uses formatter state 42 to determine whether a state of frame formatter circuitry 152 will allow for cut through mode. In this regard, buffer controller circuitry 160 can set either the cut through mode or the store and forward mode for egress buffer 154 using egress mode signal 44.

Figure 3:
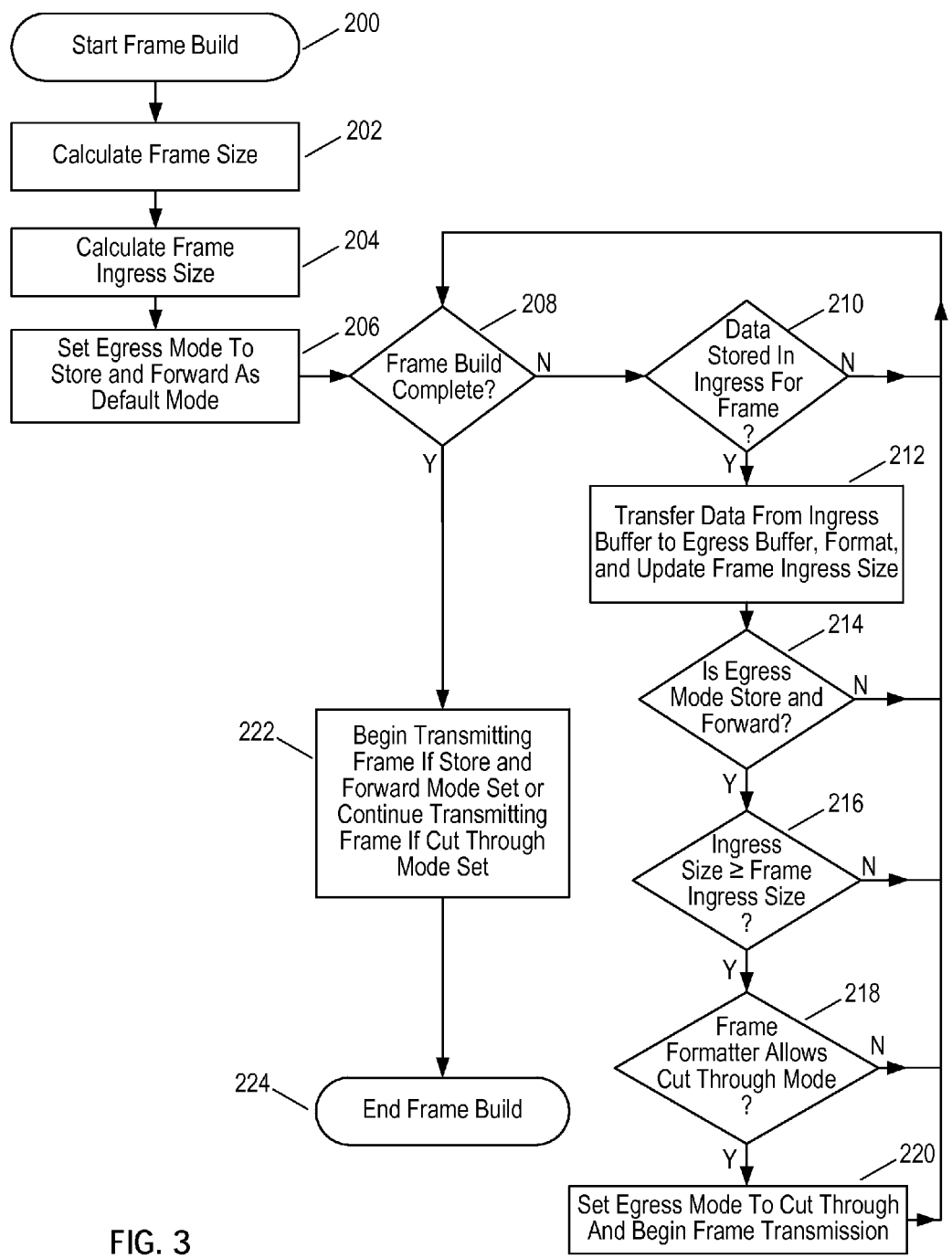
FIG. 3 is a flowchart for a frame build process according to an embodiment.

FIG. 3 is a flowchart for a frame build process that can be performed by host block 122 for each frame 50 to be transmitted to host 101 according to one embodiment. The process starts in block 200 and a frame size is calculated in block 202. The frame size is a data size corresponding to the amount of host requested data transmitted in frame 50 which does not include frame formatting data such as delimiters or a frame header used in accordance with a bus protocol. The frame size may vary from frame to frame depending upon, for example, whether the frame is the last frame transmitted to host 101 in a series of frames, or if the frame otherwise contains less than the full amount of host requested data permitted in one frame. The calculated frame size can also be referred to as the payload.

In block 204, host block 122 calculates a required ingress size for ingress buffer 150. This may be performed by buffer control circuitry 160 using ingress buffer state 40. The required ingress size can be calculated by adding the frame size to a data size for certain data path protection symbols for error detection and/or error correction such as EDC, ECC, and/or T10 DIF.

In block 206, the egress mode for egress buffer 154 is set to the store and forward mode. In block 208, buffer controller circuitry 160 determines whether the frame build is complete. In other words, buffer controller circuitry 160 determines whether all of the data for frame 50 has already been formatted by frame formatter circuitry 152. This can be based on information obtained as a part of formatter state 42.

If the frame build is not complete, buffer controller circuitry 160 checks in block 210 whether there is data stored in ingress buffer 150 for frame 50 using ingress buffer state 40. In one implementation, buffer controller circuitry may check whether a size of data stored in ingress buffer 150 is not equal to zero. If there is no data stored in ingress buffer 150 for frame 50, the process returns to block 208 to determine whether the frame build is complete.

If there is data stored in ingress buffer 150 in block 210, the data is transferred in block 212 from ingress buffer 150 and formatted by frame formatter circuitry 152 before being stored in egress buffer 154. The required ingress size is then updated to subtract out the data transferred from ingress buffer 150.

In block 214, if the egress mode for egress buffer 154 is not store and forward (i.e., the egress mode is cut through), the process returns to block 208 to check if the frame build is complete. On the other hand, if the egress mode is store and forward in block 214, buffer controller circuitry 160 compares the size of the data currently buffered in ingress buffer 150 to the updated required ingress size. In this regard, more data may have been read into ingress buffer 150 since transferring the data out of ingress buffer 150 in block 212. Buffer controller circuitry 160 determines in block 216 whether the new data stored in buffer 150 is greater than or equal to the updated required ingress size. If not, the process returns to block 208 to check if the frame build is complete. If the size of the data buffered in ingress buffer 150 is greater than or equal to the required ingress size, this means there is sufficient data stored in ingress buffer 150 to complete building frame 50 and that cut through mode can be considered.

In block 218, buffer controller circuitry 160 uses formatter state 42 to determine whether frame formatter circuitry 152 can allow for cut through mode. As noted above, this may include determining whether frame formatter circuitry 152 is using an operation such as skip mask or resource de-allocation which may not allow for use of cut through mode. In embodiments, where frame formatter circuitry does not perform operations which may conflict with cut through mode, block 218 may be omitted.

If cut through mode is allowed in block 218, buffer controller circuitry 160 sets the egress mode for egress buffer 154 to cut through mode and transmission of formatted data 20 for frame 50 begins in block 220. In this way, at least a portion of formatted data 20 for frame 50 can be transmitted as it is received in egress buffer 154. In some implementations, buffer controller circuitry 160 in block 220 may also adjust the rate at which data is received by ingress buffer 150 and/or the rate at which data is transferred out of ingress buffer 150 once the egress mode is set to the cut through mode. For example, the rate at which data is transferred out of ingress buffer 150 may be increased in the cut through mode to match the rate at which data is received by ingress buffer 150. After setting the cut through mode in block 220, the process then returns to block 208 to check if the frame build is complete.

If the frame build is complete in block 208, host block 122 begins transmitting frame 50 in block 222 if store and forward mode is still set for egress buffer 154. If cut through mode has been previously set, transmission of frame 50 continues in block 222 if not already completed. The frame build process of FIG. 3 ends in block 224.

By providing for cut through mode as discussed above, it is ordinarily possible to reduce latency in the transmission of frames from DSD 106 to host 101 without adding any gaps in the transmission of a frame. This decreased latency can offer improved data access times which can be particularly beneficial for systems where multiple devices share a common pathway to the host.

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A data storage device (DSD) in communication with a host, the DSD comprising:
    a volatile memory for storing data;
    an ingress buffer for receiving data stored in the volatile memory;
    an egress buffer for receiving formatted data for transmission from the DSD to the host in a frame; and
    circuitry configured to:
        format data from the ingress buffer into the formatted data;
        compare a size of data buffered in the ingress buffer to a frame ingress size for data to be buffered in the ingress buffer for the frame; and
        determine, based on the comparison, whether to:

buffer all of the formatted data for the frame in the egress buffer before transmission to the host, or
transmit at least a portion of the formatted data for the frame to the host before all of the formatted data for the frame is received in the egress buffer.

2. The DSD of claim 1, wherein the circuitry is further configured to determine to transmit at least a portion of the formatted data for the frame before all of the formatted data for the frame is received in the egress buffer if the size of the data buffered in the ingress buffer is greater than or equal to the frame ingress size.

3. The DSD of claim 1, further comprising a host physical layer for communication with the host in accordance with a bus protocol, and wherein the circuitry is further configured to calculate a frame size for all the formatted data of the frame such that the frame size does not include formatting data of the frame used for the bus protocol.

4. The DSD of claim 3, wherein the circuitry is further configured to calculate the frame ingress size by adding the frame size to a data size for data used for at least one of error correction and error detection.

5. The DSD of claim 1, wherein the circuitry is further configured to set a default egress mode where all of the formatted data for the frame is buffered in the egress buffer before transmission to the host.

6. The DSD of claim 1, wherein the circuitry is further configured to:
transfer data for the frame out of the ingress buffer for formatting into the formatted data; and
update the frame ingress size to account for the data transferred out of the ingress buffer.

7. The DSD of claim 6, wherein the circuitry is further configured to:
compare a size of data buffered in the ingress buffer to the updated frame ingress size; and
determine based on the comparison to the updated frame ingress size, whether to transmit at least a portion of the formatted data for the frame to the host before all of the formatted data for the frame is received in the egress buffer.

8. The DSD of claim 1, wherein the circuitry is further configured to determine whether an operation performed by the DSD conflicts with transmitting at least a portion of the formatted data to the host before all of the formatted data for the frame is received in the egress buffer.

9. The DSD of claim 8, wherein the operation includes at least one of an operation to control a rate at which formatted data is transmitted to the host and an operation to allocate use of the volatile memory.

10. The DSD of claim 1, wherein the circuitry is further configured to adjust a rate at which data is received by the ingress buffer and/or a rate at which data is transferred out of the ingress buffer, the adjusting based on whether it is determined to transmit at least a portion of the formatted data for the frame to the host before all of the formatted data for the frame is received in the egress buffer.

11. A method for transmitting data from a data storage device (DSD) to a host, the method comprising:
receiving data from a volatile memory of the DSD in an ingress buffer of the DSD;
formatting data from the ingress buffer into formatted data;
comparing a size of data buffered in the ingress buffer to a frame ingress size for data to be buffered in the ingress buffer for a frame to be transmitted to the host; and
determining, based on the comparison, whether to:
buffer all of the formatted data for the frame in an egress buffer of the DSD before transmission to the host, or
transmit at least a portion of the formatted data for the frame to the host before all of the formatted data for the frame is received in the egress buffer.

12. The method of claim 11, further comprising determining to transmit at least a portion of the formatted data for the frame to the host before all of the formatted data for the frame is received in the egress buffer if the size of the data buffered in the ingress buffer is greater than or equal to the frame ingress size.

13. The method of claim 11, further comprising calculating a frame size for all the formatted data of the frame such that the frame size does not include formatting data of the frame used for a bus protocol of the host.

14. The method of claim 13, further comprising calculating the frame ingress size by adding the frame size to a data size for data used for at least one of error correction and error detection.

15. The method of claim 11, further comprising setting a default egress mode where all of the formatted data for the frame is buffered in the egress buffer before transmission to the host.

16. The method of claim 11, further comprising:
transferring data for the frame out of the ingress buffer for formatting into the formatted data; and
updating the frame ingress size to account for the data transferred out of the ingress buffer.

17. The method of claim 16, further comprising:
comparing a size of data buffered in the ingress buffer to the updated frame ingress size; and
determining based on the comparison to the updated frame ingress size, whether to transmit at least a portion of the formatted data for the frame to the host before all of the formatted data for the frame is received in the egress buffer.

18. The method of claim 11, further comprising determining whether an operation performed by the DSD conflicts with transmitting at least a portion of the formatted data to the host before all of the formatted data for the frame is received in the egress buffer.

19. The method of claim 18, wherein the operation includes at least one of an operation to control a rate at which formatted data is transmitted to the host and an operation to allocate use of a volatile memory of the DSD.

20. The method of claim 11, further comprising adjusting a rate at which data is received by the ingress buffer and/or a rate at which data is transferred out of the ingress buffer, the adjusting based on whether it is determined to transmit at least a portion of the formatted data for the frame to the host before all of the formatted data for the frame is received in the egress buffer.

* * * * *